United States Patent [19]
Arms et al.

[11] Patent Number: 5,777,467
[45] Date of Patent: *Jul. 7, 1998

[54] MINIATURIZED DISPLACEMENT TRANSDUCER ASSEMBLY

[75] Inventors: Steven W. Arms; Christopher P. Townsend, both of Burlington, Vt.

[73] Assignee: MicroStrain, Inc., Burlington, Vt.

[*] Notice: The term of this patent shall not extend beyond the expiration date of Pat. No. 5,497,147.

[21] Appl. No.: 590,835

[22] Filed: Jan. 24, 1996

Related U.S. Application Data

[63] Continuation-in-part of Ser. No. 78,467, Jun. 21, 1993, Pat. No. 5,497,147.
[51] Int. Cl.[6] .............................. G01B 7/14; G01B 7/30; H01F 5/00
[52] U.S. Cl. .............................. 342/207.18; 324/207.24
[58] Field of Search .............. 324/207.17, 207.18, 324/207.19, 207.24; 340/870.35, 870.36; 128/782

[56] References Cited

U.S. PATENT DOCUMENTS

| | | | |
|---|---|---|---|
| 5,004,391 | 4/1991 | Burdea | 324/207.18 |
| 5,497,147 | 3/1996 | Arms et al. | 340/870.35 |

*Primary Examiner*—Walter E. Snow
*Attorney, Agent, or Firm*—Thomas N. Neiman

[57] ABSTRACT

The novel differential variable reluctance transducer assembly is comprised of an ultra miniaturized device encased in stainless steel. The assembly contains a free sliding, magnetically permeable core and two coils surrounding the core. A split ring mounting adapter system allows for a variable gauge length and interchangeable mounting pins. A highly flexible core carrier tube and support wire allows for significant bending without failure, does not interfere with the coils detection of the core, and protects the core from corrosion. A sleeve strain relief sheath has been incorporated with the sensor to avoid excessive strain to lead wires during and after installation. The position of the core is detected by measuring the coils' differential reluctance and transmitted by means of wires or telemetry to measuring equipment.

12 Claims, 2 Drawing Sheets

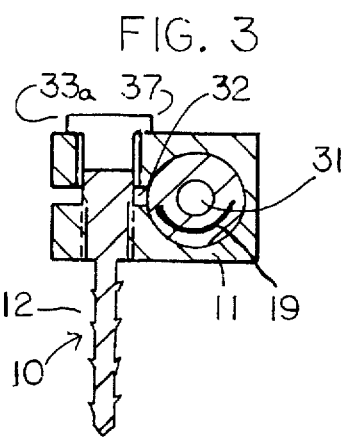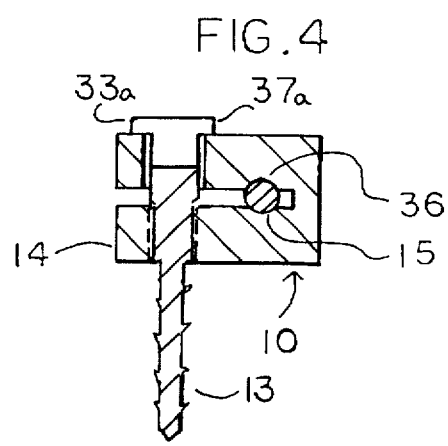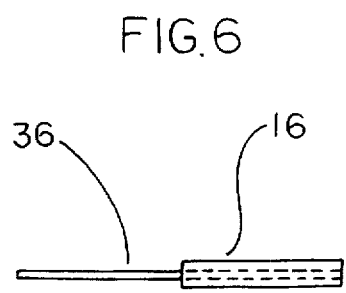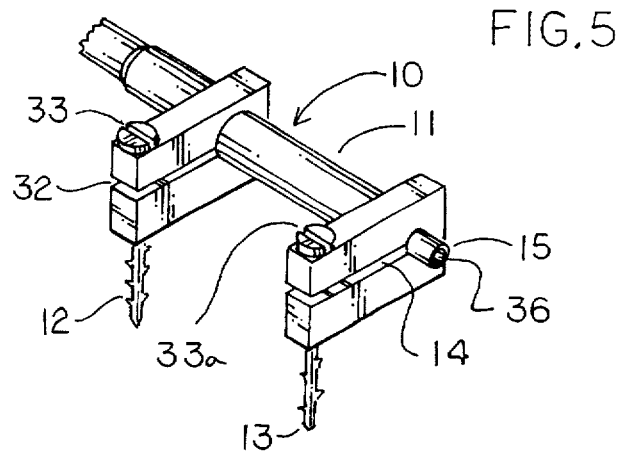

MINIATURIZED DISPLACEMENT TRANSDUCER ASSEMBLY

This is a continuation in part application based upon the utility patent application Ser. No. 08/078,467 filed on 21 Jun. 1993 now U.S. Pat. No. 5,497,147.

BACKGROUND OF THE INVENTION

This invention pertains to devices for measuring displacement and strain and, in particular, to a differential variable reluctance transducer assembly for use in delicate or hard to reach areas.

There have been a number of attempts to develop highly accurate miniaturized sensors to be used by the medical profession and by industry to measure strains. Examples of this type device are many systems using Hall Effect displacement sensors. The United States Patent issued to Steven W. Arms, U.S. Pat. No. 4,813,435 issued on 21 Mar. 1989 is an example of this type system. Other attempts in this area include the United States Patents issued to Robert W. Redlich, U.S. Pat. No. 4,667,158 issued on 19 May 1987 and to Alec H. Seilly, U.S. Pat. No. 4,350,954 issued on 21 Sep. 1982. There are, however many difficulties with those type devices. Among the difficulties are moisture problems, noise interference, core rotation artifact, and limited linear range. Miniaturization of the sensor may also lead to fragility of sensor components, especially the tendency for transducer to become bent or kinked.

What is needed is a miniature system for displacement/strain measurement that is easy to apply without concern for damage to the small sliding core. Traditional core carrying tubes such as stainless steels become fragile in small diameters. Once these core carrying tubes are deformed, they can prevent free sliding within the detection coils, or become jammed. This prevents accurate measurement. If the user attempts to remedy the situation, it may produce a local change in the electromagnetic permeability in the core carrier, which could alter the sensors calibration or produce a non linearity in sensor output. A new core carrier material is needed that overcomes these limitations.

What is needed is a system which is simple and easy to use, has increased linear range and higher signal to noise ratio which are inherent in a differential variable reluctance transducer. What is also needed are micro power circuitry for use in the system which will allow the user to count and monitor remote signals from the transducer for ease of evaluation.

It is the object of this invention to teach a miniaturized displacement transducer assembly which avoids the disadvantages and limitations, recited above in similar systems. Another object of this invention is to provide an system that is simple to operate, extremely effective and very cost effective with sufficient power and accuracy, at the same time, be extremely efficient.

SUMMARY OF THE INVENTION

Particularly, it is the object of this invention to teach a miniaturized displacement transducer assembly, for use in industrial and medical research applications to measure strains or displacement in areas previously considered inaccessible, comprising a housing; said housing comprising a hollow tubular structure; said housing having positioning means at least one end of said housing; slideable core means located within said housing; said slideable core means having positioning means attached; said slideable core means comprising a metallic center; said metallic center having a circumference of a superelastic material; a plurality of coils surrounding said core means; said coils having implanting means for positioning said coils within said housing; and said coils further having circuitry attachment unit. It is also the object of this invention to teach a differential variable reluctance transducer assembly, for use in industrial and medical research applications to measure strains and displacement in areas previously considered inaccessible, comprising a housing; said housing comprising a hollow tubular structure; slideable core means located within said housing; said slideable core means comprising a metallic center; said metallic center having a circumference of superelastic material; a plurality of coils surrounding said slideable core means; said coils having implanting means for positioning said coils within said housing and said coils having a circuitry attachment unit. Finally, it is the object of this invention to teach a differential variable reluctance transducer assembly, for use in industrial and medical research applications to measure strains and displacement in areas previously considered inaccessible, comprising a housing; said housing comprising a hollow tubular structure; slideable core means located within said housing; said slideable core means comprising a metallic center; said metallic center having a superelastic rod receiving aperture located therein; a plurality of coils surrounding said slideable core means; said coils having implanting means for positioning said coils within said housing; and said coils further having a circuitry attachment unit.

BRIEF DESCRIPTION OF THE DRAWINGS

Further objects and features of this invention will become more apparent by reference to the following description taken in conjunction with the following figures, in which:

FIG. 3 is a cross sectional view thereof taken along line A—A of FIG. 1;

FIG. 4 is a cross sectional view thereof taken along line B—B of FIG. 1;

FIG. 5 is a perspective view thereof; and

FIG. 6 is a partial exploded view showing an alternative embodiment of FIG. 2.

DETAILED DESCRIPTION OF THE PREFERRED EMBODIMENT

Figure 1:
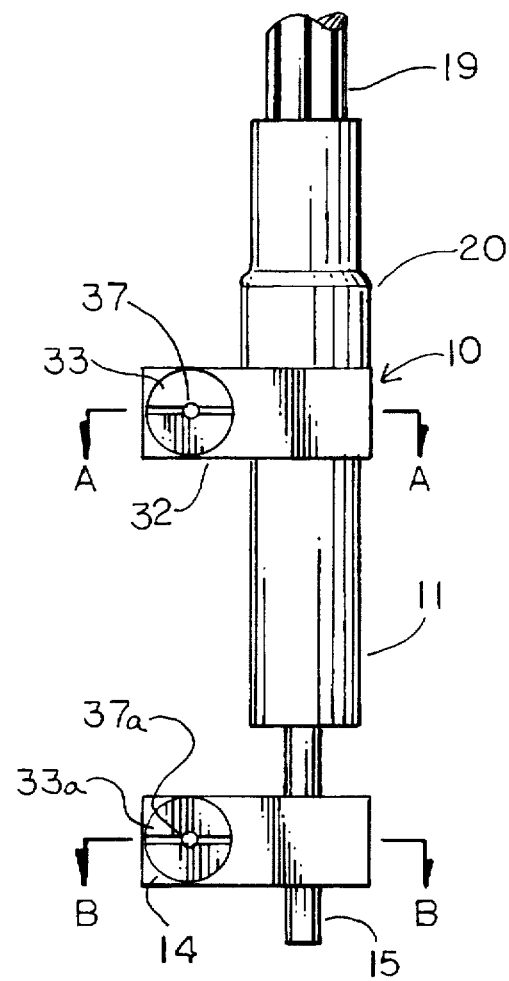
FIG. 1 is a top plan view of the novel differential variable reluctance transducer assembly.
Figure 2:
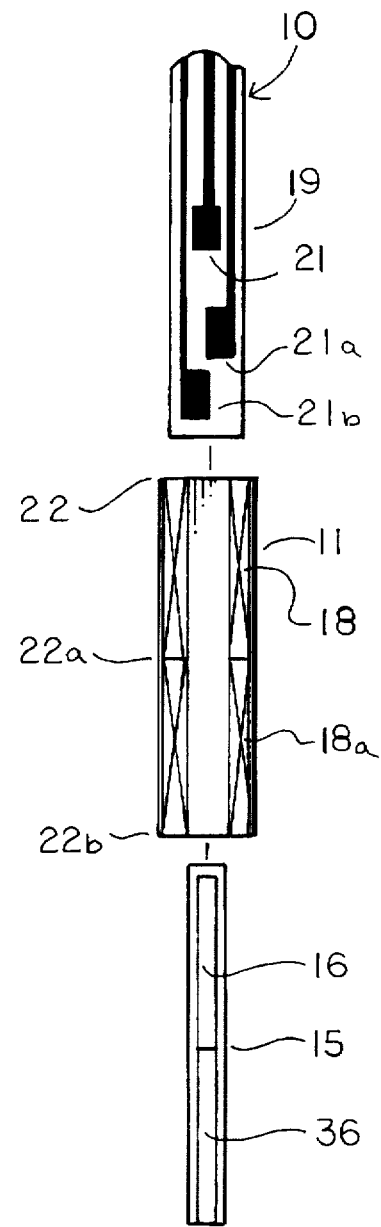
FIG. 2 is an exploded view thereof.

As shown in the figures, the system 10 comprises a housing 11 that is comprised of a hollow tubular stainless steel structure. The housing is positioned by means of a barbed probe 12 attached at one end of the housing 11. Housing 11 may have a coating or thin continuous layer of insulation on its inner diameter to provide enhanced electrical isolation of the internal electronics from the housing as well as the external environment. The housing surrounds a bobbin 31 which may be formed of a stainless steel tube or other materials. The barbed probe 12 has a split ring clamp 32 for positioning and also a tensioning screw 33 for the holding and for the removal of the system as desired. A second barbed probe 13 has a split ring clamp 14 into which one end of the core carrier tube 15 is attached. The split ring arrangement allows the barbs to be located at any point along the differential variable reluctance transducer housing 11 or along the length of the core, carrier tube 15. Clamps can be loosened with a turn of the screws 33 and 33a and positioned as needed. The screws 33 and 33a have vertical apertures 37 and 37a to provide for precise positioning of the barbs 12 and 13 during insertion. This ability to adjust the initial gauge length allows a single sensor to be used on a variety of samples with varying compliance. For example, on materials which strain a large amount, the barbs or attachments may be placed closer together in order to maintain differential variable reluctance transducer output in its linear range.

The core carrier tube 15 is inserted into the bobbin 31 but all slide freely within the bobbin 31. The barbs can also be replaced; in this case, adhesive attaching pads may be used or the screws may be lengthened and secured by a nut to another part which contains an aperture. The slideable core 16 is comprised of a magnetically permeable metallic center bonded within a core carrier tube or circumference 15 which is comprised of a superelastic material such as a nickel-titanium mixture. The slideable core 16 can also be constructed of a conductive material. A reinforcement rod 36 comprised of a superelastic wire is fixed within the nickel-titanium circumference 15 and is totally non magnetic. The metallic center may also be attached to a superelastic rod. In that case, the superelastic circumference or core carrier tube would not be used and an aperture would be drilled in the metallic center to receive the superelastic rod. A disadvantage of this version is that corrosion resistance would be lessened compared with the core carrier tube. A plurality of coils 18 and 18a are wrapped around the bobbin 31 and epoxy 38 potted into position within the housing 11. Bobbin 31 may be covered or coated with a thin continuous layer of insulation, such as polyimide, to enhance electrical isolation of the coils 18 and 18a from bobbin 31. These coils may also be formed by vacuum deposition of conductive material onto the bobbin 31 or by winding fine wire, and subsequent controlled photolithographic or laser micro machining for removal of conductive material to facilitate connection to output bonding and to produce a bonded coil on the bobbin 31. The coils 18 and 18a are attached (electrically) to flat, flexible pads 21, 21a and 21b with the coils leads 22, 22a and 22b. A flexible sheath 20 prevents excess bending of wire circuits 19. Flexible tubular sheathe 20 is a hollow tubular boot of tubing, such as silicone rubber, which provides flexibility but prevent sharp bending of coil leads 22, 22a and 22b at their connection to the housing 11 and the bobbin 31. This tubular sheath allows bobbin 31 to be vented to the external environment. This is important to provide pressure equalization and the venting of fluid at the back of the bobbin, which improves the maintenance of free sliding of the core carrier tube 15 in a aqueous environment. The use of this super elastic material for the slideable core carrier tube allows for a significant amount of bending without failure. Angular misalignment of the core and the coil can be tolerated to a much greater degree. The flat flexible circuitry 19 provides for greatly reduced size, since the internal bonding pads 21, 21a and 21b may be curved to fit in close proximity to the coils 18 and 18a, within the epoxy potting compound. The wire circuits are directed individually into oscillators which resonate at a frequency dependent on core position. A mixing circuit combines those frequencies, providing the frequency difference between each of the oscillators. This difference is sent to a high frequency carrier oscillator and is used to modulate the high frequency carrier. This frequent modulated carrier signal is sent to an FM antenna for wireless data transmission.

The receiving system is comprised of an FM receiver which receives a signal from the FM antenna. The signal is then sent through an amplifier and then enters a phase-locked- loop circuit which clarifies the signal and sends the signal to a microprocessor which counts the signal and then displays and stores the information. Software controls the function of the microprocessor and is used to access calibration files for specific differential variable reluctance transducers and enhance their performance by implementing algorithms for temperature compensation and linerazation. Linerazation is accomplished by multiple breakpoint polynomial regression using a microprocessor controlled by software. The data used to develop the multiple breakpoint polynomial regression is found by calibrating the differential variable reluctance transducer using gage blocks of known thickness or by incrementally moving the differential variable reluctance transducer using a fine micrometer thread. These calibrations are then curve fitted using multiple ordered polynomial connected at breakpoint which are selected by the user in order to achieve a required accuracy.

The operation of the novel miniaturized displacement transducer assembly system is enhanced by being ultra miniaturized to allow access to delicate or hard to reach structures. The encased device is comprised of two coils and a free sliding, magnetically permeable core. Core movements cause one coils' reluctance to be increased, while the other is decreased. The difference is a very sensitive measurement of the core's position. Temperature changes cause each coil's reluctance to change similarly, thereby canceling out these effort. The eletrical connections are potted in epoxy within the casing which results, in outstanding moisture resistance. A free sliding core carrier tube in the form of a super elastic tube and reinforcing superelastic wire are used to overcome the limitations of conventional core materials, such as, fatigue, bending and the potential change in calibration that may occur with stainless steel core materials. Measurement of the core's position can also be accomplished by measuring the coils differential reluctance using sinewave excitation and a synchronous demodulator.

While we have described our invention in connection with specific embodiments thereof, it is clearly to be understood that this is done only by way of example and not as a limitation to the scope of our invention as set forth in the objects thereof and in the appended claims.

We claim:

1. A miniaturized displacement transducer assembly, for use in industrial and medical research applications to measure strains or displacement in areas previously considered inaccessible, comprising:

a housing;

said housing comprising a hollow tubular structure;

said housing having positioning means attached at least one end of said housing;

slideable core means located within said housing;

said slideable core means having positioning means attached;

said slideable core means comprising a metallic center;

said metallic center having a circumference composed of a superelastic material;

a plurality of coils surrounding said slideable core means;

said coils having implanting means for positioning said coils within said housing; and said coils further having a circuitry attachment unit.

2. A miniaturized displacement transducer assembly according to claim 1, wherein:

said housing positioning means comprises at least one split ring mounting adapter unit attached at one end of said housing;

said split ring mounting adapter unit having means for varying the tension on said slideable core; and said tension varying means comprises a screw tightening device.

3. A miniaturized displacement transducer assembly, according to claim 2, wherein:

said split ring mounting adapter unit comprising construction of a material that is non-magnetic and is poorly or non-conductive.

4. A miniaturized displacement transducer assembly, according to claim 2, wherein:

said screw tightening device comprises construction of a material that is non-magnetic and is poorly or non-conductive.

5. A differential variable reluctance transducer assembly, according to claim 1, wherein:

said flexible core means comprises the use of super elastic material which allows for the bending of said circuitry attachment unit without the probability of failure; and said superelastic material comprises the use of a nickel-titanium mixture.

6. A miniaturized displacement transducer assembly, according to claim 1, wherein:

said metallic center having a magnetically permeable material construction; and said metallic center having a conductive material construction.

7. A miniaturized displacement transducer assembly according to claim 1, wherein:

said coil implanting means comprises the potting of said coils in epoxy.

8. A miniaturized displacement transducer assembly according to claim 1, wherein:

said circuitry attachment unit comprises circuitry means adhesively attached to said coils; and said circuitry attachment unit further comprises a connection piece attached to said coils.

9. A miniaturized displacement transducer assembly according to claim 8, wherein:

said circuitry means comprises flexible wire means; and said wire means having flexible protective means surrounding said wire means for permitting protection and flexibility.

10. A miniaturized displacement transducer assembly according to claim 9, wherein:

said flexible protective means comprises a sheath surrounding said flexible wire means for providing protection for said flexible wire means during installation and operation of said differential variable reluctance transducer assembly.

11. A miniaturized displacement transducer assembly for use in industrial and medical research applications to measure strains and displacement in areas previously considered inaccessible, comprising:

a housing;

said housing comprising a hollow tubular structure;

slideable core means located within said housing;

said slideable core means comprising a metallic center;

said center having a circumference of superelastic material;

a plurality of coils surrounding said slideable core means;

said coils having implanting means for positioning said coils within said housing; and said coils further having a circuitry attachment unit.

12. A differential variable reluctance transducer assembly, for use in industrial and medical research applications to measure strains and displacement in areas previously considered inaccessible, comprising:

a housing;

said housing comprising a hollow tubular structure;

slideable core means located within said housing;

said slideable core means comprising a metallic center;

said metallic center having a receiving aperture located therein;

a superelastic rod positioned within said receieving aperture;

a plurality of coils surrounding said slideable core means;

said coils having implanting means for positioning said coils within said housing; and said coils further having a circuitry attachment unit.

* * * * *